3,301,682
FAT CRYSTALLIZATION
Ching C. Loo, Sepulveda, Los Angeles, Calif., assignor to Carnation Company, Los Angeles, Calif., a corporation of Delaware
No Drawing. Filed Sept. 5, 1963, Ser. No. 306,678
6 Claims. (Cl. 99—56)

This application is a continuation-in-part of my prior United States patent application No. 46,372, filed August 1, 1960, and entitled Fat Containing Product and Its Method of Manufacture, which is now abandoned.

The present invention relates to a fat-containing product and to its method of manufacture and specifically to a fat-containing lacteal product and the method for the manufacture of such product in situ.

Fat-containing products in which the fat ingredient is composed of fractions having different melting points, such as for example, milk, or any lacteal product, have certain behavior characteristics attributable to these various fractions of its fat content. Therefore, for example, a dried whole milk product is ordinarily referred to as being non-wettable. By non-wettable, reference is made to the fact that when a given quantity of this product is placed upon the surface of water or any other liquid, it will not sink below the surface so that it can be dispersed by simple stirring.

It has been the suspicion for many years of those skilled in the art that the resistance to wettability of dried fat-containing lacteal products is attributable to that portion of the butterfat content which has a melting point higher than the water into which the product is being reconstituted. Various attempts have been made to counteract this resistance to wettability of this high melting point fraction, but all of such attempts have resulted in failure except in those instances where this resistance is reduced by the addition of a wetting agent, such as for example, lecithin.

It is common practice, therefore, to add a pre-determined percentage of a wetting agent, lecithin, to dried whole milk to induce the degree of wettability into the product necessary for consumer convenience. The use and addition of lecithin, however, is not always possible and therefore continuing effort has been directed toward a method for the manufacture of such a product without the addition of such a wetting agent, but which would still be equal to, with respect to wettability, if not better than, such product. It is also well-known that fat such as butterfat is composed of many fractions having varying melting points and the relationship and percentage of these fractions is variable seasonally as well as with reference to the geographic origin of the raw milk. It is also well-known that it is possible to isolate by crystallization a high melting point fraction from those fats. The current industial process for achieving such separation is referred to broadly as "winterizing," and is well-known to those skilled in dairy or food technology. Examples of a "winterizing" technique are found in United States Patent No. 2,619,421 to Greenfield, and No. 2,966,-409 to Williams et al.

It is an object of the present invention to provide a process for manufacturing an easily wettable, readily dispersible, fat-containing product, suitable for use in foods and beverages. A further object is to provide a process which does not require the prior art steps of "winterizing." Yet another object is a fat crystallization process which is performed in situ.

A further object is to produce a dry fat-containing product which is readily dispersible and wettable in warm water without the aid of chemical additives such as lecithin. Still another object is a process which when applied to lipids of milk produces a novel fat-containing product wherein the fat retains its natural globule membrane and stability.

The present invention contemplates fractionating the fat into a high melting point fraction and a low melting point fraction in situ prior to drying so that the final spray dried product is characterized by the high melting point fraction being separated from the low melting point fraction by the non fat solids portion. In the dry product the low melting point fraction (i.e. the fraction melting below the temperature of the water into which the product is to be dispersed) and the non fat solids portion are wettable. Each of these portions come into initial contact with the water prior to the high melting point fraction and the physical wetting or sinking below the surface of the low melting point fraction and the non fat solids will carry with it the high melting point fraction. As an end result, a dried fat-containing product can be manufactured which is characterized by being instantly wettable and readily dispersible in water to form a reconstituted beverage.

The basic principles of the present invention entail the steps of fractionating the fat at a predetermined temperature level. This temperature at which the fat is fractionated is so chosen that it is slightly lower than the preferred temperature of the water into which the product is reconstituted. Also, the fat should be brought to a temperature somewhere between its melting point and its set point (set point as used herein is synonymous with setting point or congeal point), preferably a temperature that would allow a significant portion of the fat to crystallize out within a convenient length of time. It has been found that such a fractionating temperature is preferably about 75° F. for a lacteal product using its natural butterfat system.

As above suggested, the fractionation temperature is slightly lower than the preferred temperature of the water into which the product is reconstituted and is any temperature between the melting point and set point of the fat. A fractionating temperature of about 75° F. allows a significant portion of the butterfat to crystallize out within a minimum period of time and the crystals formed are sufficiently large to permit sharp fractionation.

Additionally, the basic concept entails the actual physical separation of fat fractions so that during any subsequent spray drying, the high melting point fraction will remain in its separate, and preferably solid, state and be surrounded by the non fat portion and isolated from the low melting point portion.

The resulting spray dried product can then be subjected to further processing, for example, instantizing, wherein the individual particles are moistened and caused to adhere together in random shaped aggregates such as clearly described and claimed in United States Letters Patent No. 2,835,586 to David D. Peebles dated May 20, 1958.

The process of the present invention utilizes a fat composition comprising fat fractions of different melting points, and a non fat, non miscible composition. The fat and non fat compositions are subjected to in situ crystallization of that portion of the fat composition having a melting point greater than a temperature between the melting point and the set point of the fat subjected to crystallization. Then, the high melting fraction of the fat is separated from the low melting point fraction by fractionation of the fat. In other words, the fat and non fat composition are subjected to in situ crystallization whereby that portion of the fat composition having a higher melting point than the crystallization temperature solidifies and forms many individual crystals inside each fat globule. Then, when the entire product is passed through a homogenizer or a spray nozzle, the violent turbulence breaks the low melting liquid fat from the high melting solid crystals, thus completing the fractionation process in situ.

Preferably, the non fat, non miscible composition comprises a continuous aqueous phase which is further characterized in that it contains dispersed non fat solids in the aqueous carrier. In fractionating the high and low melting point fat fractions, the fractionation is preferably accomplished in situ using means, such as homogenization valve or spray drier, which separate the fat into small discrete globules, which upon spray drying become coated with the non fat, non miscible, composition.

In the crystallization and fractionation steps of the process the fat containing composition is being acted upon. The phenomenon of crystallization is known to be broadly applicable to fats of varying melting points, regardless of their origin; accordingly, while lipids of milk are the preferred fats, vegetable fats and animal fats such as coconut oil, olive oil, safflower oil, corn oil, soya oil, tallow and lard may suitably be used in the invention.

In the dried product produced according to this invention, the primary function of the non fat solids contained in the non miscible phase is to form a matrix which coats and separates the discrete fat globules. To achieve the desired wettability it is, of course, necessary that the non fat solids be wettable. Lacteal non fat solids are preferred. However, other non fat solids such as corn syrup solids, lactose, sucrose, dextrose and other sugars are suitable.

The invention will be described more specifically by reference to the preferred embodiment, a lacteal-butterfat system.

EXAMPLE I

An example of the manufacture of a dried fat-containing lacteal product is as follows:

Fresh raw milk
↓
Heated to 240° F. no hold
↓
Concentration to 40% T.S.
↓
Cool to 80° F. rapidly
↓
Cool to 75° F. in 1 hour
↓
Hold at 75° F. for 1 hour
↓
Homogenize at 75° F.

In referring to this flow diagram, it will be noted that the initial starting material is fresh raw milk, although it will be appreciated that it can be any fat-containing lacteal product having any pre-determined fat content. The initial step is to forewarm the starting material according to any customary or suitable procedure to induce storage stability, such usual procedure entailing flash heating to 240° F. After forewarming, the material is then concentrated to preferably 40% total solids, although the percentage of total solids is not critical. 40% total solids is preferable because of the economies involved in later spray drying procedures if the final desired product is dried. At this stage, all fractions of the fat content are in their melted state. The next procedures entail the basic features of the present invention, namely, crystallizing the high melting point fat fraction and then physically separating the fractions. This crystallization is preferably effected by a tempering procedure. The concentrated material is allowed to cool rapidly to approximately 80° F., the fractionating temperature in this instance being chosen as 75° F. It should be stated once again, however, that the fractionation temperature can be any temperature between the melting point and the set point of the fat composition. After the temperature has been reduced to 80° F., it is allowed to cool slowly from 80° F. to 75° F. The time for reducing the temperature these 5 degrees is critical since it is at this stage that crystallization of the high melting point fraction is induced. It has been found that a time of approximately one-half hour to one hour is sufficient. It is held at this fractionating temperature of 75° F. for a period preferably an additional hour, and in any event, for that time necessary to permit the high melting point fat fraction crystals to grow to a size which will permit effective fractionation. The fat globules are now characterized as having a low melting point fraction in liquid state and a high melting point fraction in crystallized or solid state. The next step is to physically separate or fractionate the two fractions and this physical separation is preferably effected by homogenizing the product at the chosen fractionating temperature of 75° F. It has been found that any homogenizing pressure of 300 p.s.i. or more is operable, though higher homogenizing pressures are preferred because they give better homogenizing efficiency. The final liquid product is therefore characterized as a lacteal product in which the fat ingredient consists of two physically separated fractions of different melting points, which have been formed in situ, one fraction having a temperature higher than 75° F. in the present instance and being in its solid crystallized state and irregular in shape, and the other fraction being in its liquid state having a melting point of 75° F. or less.

It will be appreciated that the fractionation will be effected more sharply if the crystals of the high melting point fraction are large and concise. Fractionation can also be effected by the nozzle of an ordinary spray drier so that if a final spray dried product is desired, the concentrated lacteal material prior to homogenization can be delivered directly to the spray drier.

It is also possible to modify the above procedure so that after forewarming and concentrating, the initial product can be rapidly cooled to the fractionating temperature and then held at this fractionating temperature for a period of time sufficient to induce sufficient crystallization so that after the fractionating step, the two fractions are physically separated and discernable under a microscope of a magnification of about 1000×.

It will also be appreciated that the concentrating step is important only in the event a dried or concentrated product is desired. Also, prior to further processing, the initial starting material can be pasteurized in any usual method, and if concentrating is desired, such concentrating can be effected after homogenization.

In the above example, the crystallization of the high melting point fraction and the subsequent fractionation of this high melting point fraction from the low melting point fraction was effected without separation of the raw starting material into its cream portion and non fat or skim milk portion.

EXAMPLE II

In the following Example II the initial starting material is first separated by any ordinary or suitable procedures into its non fat or skim milk portion, and its cream portion.

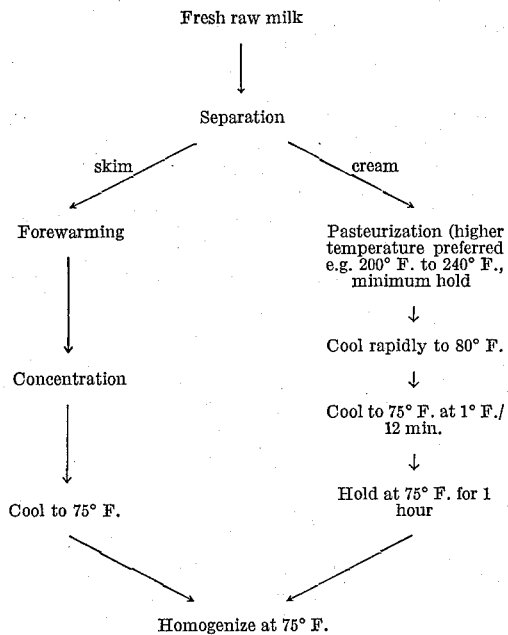

The non fat or skim milk portion is then subjected to ordinary processing technique entailing the steps of forewarming, concentrating, and cooling, the cooling reducing the temperature of the product to the chosen fractionation temperature, which in this instance is again indicated as being 75° F. The cream portion is indicated as being initially pasteurized and preferably by high temperature flash procedures, such as for example, 200° F.–240° F. The pasteurized cream is then cooled rapidly to 80° F. and then slowly, about 1 degree per 12 minutes, to 75° F. This tempering action induces crystallization of that fraction of the fat having a melting point greater than 75° F. or the fractionation temperature. Growth of the crystals is further induced by holding the cream at this fractionation temperature for an additional period of time, for example, an hour. The cream portion and the non fat or skim milk portion are then blended, each of which has a temperature of 75° F., and homogenized at a pressure of 300 p.s.i. or more. The homogenization effects fractionation of the two fat fractions and the resulting lacteal product has the same characteristics as the product described with reference to the first mentioned procedure.

In both the foregoing examples it is important to note that winterizing procedures considered necessary in the prior art are avoided. In addition to avoiding steps considered essential in the prior art, the in situ process of this invention produces unique products from lipids of milk. Lipids of milk in their natural state are associated with a fat globule membrane. Lipids containing their natural membrane have physical properties not possessed by lipids which have been destabilized and recombined. For example, N. King in "The Fat Globule Membrane," Commonwealth of Australia, Bureaux, 1955—pp. 74–75, teaches that cream having a natural membrane structure is vastly more stable than cream containing a synthetic, recombined membrane. The process of this invention does not require the separation of butter oil before crystallization and the natural fat membrane remains associated with the fat. Thus, a final product having natural fat membrane and exhibiting unique properties is produced by this invention.

The preservation of the natural fat globule membrane in products produced by the present invention is demonstrated by the following:

EXAMPLE III

Two products were prepared; one was a tempered whole milk power prepared by the process of this invention. The other was prepared according to the fat separation procedure described in U.S. Patent No. 2,966,409, and is herein called the Recombined Sample. The recombined powders contained one powder having a high melting (102.2° F.–39° C.) butter oil fraction and a low melting (68° F.–20° C.) butter oil fraction.

On a dry basis the Recombined Sample prepared by the procedure of U.S. Patent No. 2,966,409 contained 26.8% fat. On a dry basis the Tempered Sample contained 26.7% fat. The Tempered Sample appeared to be homogenized somewhat more poorly than the Recombined Sample.

It is assumed that a difference in the stability of the fat globule membrane will be reflected in the amount of fat extracted from the powder under prolonged ethyl ether extraction at about 95° F. This assumption is based on references establishing that the natural fat globule membrane is more stable than a recombined membrane. A reference supporting this proposition is N. King, "The Fat Globule Membrane," Commonwealth of Australia, Bureaux, 1955—pp. 74–75.

The Recombined Sample and the Tempered Sample were subjected to three separate extractions with ethyl ether at 95° F. and the results were as follows:

PERCENT FREE FAT

| Length of Extraction | Recombined Sample | Tempered Sample |
| --- | --- | --- |
| 2 hours | 25.01 | 19.05 |
| 4 hours | 25.4 | 21.0 |
| 18 hours | 25.6 | 24.5 |

It is apparent from the above results that the Tempered Sample prepared by the process of this invention, in all cases yielded less free fat than the Recombined Sample. The difference in extracted fat is greater in the samples treated for two hours than in those treated for eighteen hours. This indicates that the Tempered Sample, containing the natural fat globule membrane, is more resistant to extraction. Both the smaller amount of fat extracted from the Tempered Sample and the resistance of the Tempered Sample to extraction reflect the stability of the fat globule membrane and support the proposition that the Tempered Sample contains the natural fat globule membrane.

N. King, in "The Fat Globule Membrane," states that natural creams withstand washing better than artificial or recombined creams. To demonstrate that a product prepared by this invention contains the natural fat globule membrane the above-described Tempered Sample and Recombined Sample were reconstituted. A fat rich supernatant was separated by centrifugation. The supernatant was initially washed with 70° F. water and then washed with successive quantities of water above the melting point of butter.

The supernatant material of the Recombined Sample resembled granules of white butter and would not disperse. The supernatant from the Tempered Sample was smoother and dispersed easily. When the emulsions were warmed to 140° F., free oil formed indicating that the fat globules were present and that the emulsion broke. The following results were obtained by washing the product three times at 120° F. and once at 140° F.

EXAMPLE IV

| Sample Size—1,000 grs. powder, 2,000 grs. water | Recombined Sample | Tempered Sample |
|---|---|---|
| Initial supernatant material, g | 30 | 6 |
| Vol. after washing, ml | 4 | 0.3 |
| Vol. free oil, ml | 2.6 | 0.1 |
| Vol. free oil/Total Vol.×100, percent | 65.0 | 33.3 |

For the second run, the Tempered Sample and Recombined Sample were again reconstituted. A Waring Blendor was used to insure complete reconstitution. The supernatant was separated by suction after initially centrifuging at 1700 r.p.m. The fat rich material was pooled and washed in the following manner:

EXAMPLE V

| Washing | R.p.m. | Temp. of Wash Water, °F. | Recombined Sample | Tempered Sample |
|---|---|---|---|---|
| 1 | 1,450 | 70 | 21 g. butterlike [1] | 4 g. butterlike.[1] |
| 2 | 1,090 | 70 | 28 g. butterlike [1] | Do.[1] |
| 3 | 1,090 | 120 | 19 g. butteroil | No free oil; 1 g. butterlike, remainder creamlike. |
| 4 | 1,090 | 120 |  | No free oil; 3 g. lighter than water. |
| 5 | 1,090 | 120 |  | Trace oil. |
| 6 | 1,450 | 120 |  | Approx. 1 g. butteroil. |

[1] Soft, dry, granular appearance resembling granules of white butter.

Referring to the washing procedure of Example V, the fat rich material from the Recombined Sample broke to yield free butter oil after the third washing when it was first washed with water at 120° F. It is most probable that the emulsion would have broken on the first washing if the water would have been at 120° F. Fat rich material from the Tempered Sample showed only traces of butter oil after five washings, three of which were at 120° F. The emulsion broke after the sixth washing of the Tempered Sample.

It is clear from the stability of the Tempered Sample and the small percentage of butter oil extracted from the Tempered Sample that it contains fat of distinct physical properties from that produced by the procedure utilized in making the Recombined Sample. The only logical inference is that the Tempered Sample contains the natural fat globule membrane whereas the Recombined Sample contains a recombined fat globule membrane, which is less stable.

Another unique property of the product of this invention is the uniform fat distribution. Each dried particle contains discrete globules of high and low melting fat. The method of in situ crystallization and fractionation insure substantial uniformity because each dried particle will contain some of the initial solid crystalline fat and some of the initial liquid fat. Thus, each particle of the product of this invention will rewet uniformly.

To illustrate the general applicability of the present invention the following procedure was carried out on coconut oil using lacteal solids as the non-miscible carrier in Example VI and corn syrup solids in Example VII.

EXAMPLE VI

Two batches of filled milk were prepared. Each was composed of 30 lbs. of coconut oil and 281 lbs. of skim milk having 32% total solids. These batches were designated as A and B.

Batch A was used as a control, and Batch B was subjected to the process of this invention.

Batch A

*Step 1.*—The mixture was warmed to a temperature of 140° F. to melt the fat.

*Step 2.*—The mixture was homogenized at 1600 p.s.i. with 500 p.s.i. back pressure using a standard Manton-Gaulin valve.

*Step 3.*—The homogenized mixture was spray dried at 160° F. using standard spray drying conditions.

Batch B

*Step 1.*—Batch B was subjected to Steps 1 and 2 as described in Batch A.

*Step 2.*—Following homogenizing, Batch B was cooled quickly to a temperature of 78.8° F.

*Step 3.*—The sample was then cooled 0.9° F. every fifteen minutes.

*Step 4.*—Upon reaching a temperature of 75.2° F., cooling was ceased and the sample held at that temperature for a period of one hour.

*Step 5.*—The treated sample was then homogenized at a temperature of 75.2° F. using the procedure described above.

*Step 6.*—Batch B was spray dried at 75° F. using the standard spray drying conditions and equipment described in Batch A.

Batches A and B were instantized using standard instantizing procedures, as described in U.S. Patent No. 2,835,586 to Peebles. Both samples were instantized without lecithin or other wetting agents.

To establish the effectiveness of the process of this invention, the Sinking Time of each sample was determined. The following procedure was observed: Two grams of powder from each batch were deposited on the surface of 100 ml. of water in a 400 ml. beaker. The water was at a temperature of 80° F., and the time required for all granules to wet was recorded. During the testing procedure, samples were held in closed glass jars at room temperature (72° F. ±2° F.). The Sinking Times were as follows:

| Time (days) | Batch "A" | Batch "B" |
|---|---|---|
| 1 | Immediate | Immediate. |
| 2* | 2.4 minutes | 1.6 minutes. |
| 3* | 4.9 minutes | 1.6 minutes. |
| 6* | 150.0 minutes | 8.1 minutes. |

*5 samples were examined for each variable.

EXAMPLE VII

| Ingredient: | Amounts (lbs.) |
|---|---|
| Corn syrup solids | 81.0 |
| Coconut oil | 53.3 |
| Na Caseinate | 7.0 |
| Dipotassium phosphate | 3.0 |
| Mono and di glycerides | ([1]) |
| Carotene (24%) | 0.0026 |
| Riboflavin | 0.0020 |
| Water | 215.00 |

[1] Sufficient to stabilize.

The product was homogenized at a pressure of 1600 p.s.i.+500 p.s.i. back pressure. The sample was divided into two equal portions and one, herein called the Control was spray dried in the conventional manner. The other, herein called the Tempered Sample, was cooled rapidly to 79° F. and then cooled to 75.2° F. by lowering the temperature (0.5° C.–0.9° F.) every fifteen minutes. It was held for one hour at 75° F.±0.3° F. and was then homogenized at that temperature using 1600 p.s.i.+500 p.s.i. back pressure. The test sample was spray dried at a feed temperature of 75.2° F. using the same conditions as those for the Control. Both products were instantized under the same conditions.

After aging the Control and Tempered Samples for twelve days at 72° F.±2.0° F. the Sinking Time of the samples was determined. Five determinations were made for each sample and the arithmetic average was as follows:

| Sample: | Sinking time, minutes |
|---|---|
| Control | 11.6 |
| Tempered | 8.0 |

After manufacturing the liquid fat-containing product, further processing can be conducted depending, of course, upon the desired end product. If, for example, a dried fat-containing lacteal product is desired, such product can be subjected to usual spray drying techniques. In such spray drying techniques the high melting point fraction is in separated and preferably solid state. Since the non fat portion and the low melting point fraction are in liquid state, the spray dried particle is characterized by the solid high melting point fraction of fat being coated or surrounded by the non fat portion and separated from the low melting point fraction of fat. The high melting point fraction, therefore, is isolated to such an extent that the wettability of the low melting point fraction of fat and the non fat portion carries with it this high melting point fraction. It is further possible, as previously suggested, to subject the liquid lacteal product after crystallization of the high melting point fraction of the fat to spray drying procedures prior to homogenization and the action of the nozzle of the spray drier is sufficient to effect fractionation of the high melting point fraction from the low melting point fraction. It is further possible to subject such lacteal products to processing to manufacture so-called instantized products which are characterized by being in the form of aggregates which consist of smaller particles firmly adhered together in random size and shape. Such a product is set forth in United States Letters Patent No. 2,835,586 to David D. Peebles May 20, 1958. Instantized products can be manufactured either by procedures entailing rewetting conventionally spray dried product, or by forming such aggregated products directly from the fractionated liquid lacteal material.

Fat crystallization will occur, as described herein, with exceedingly small quantities of fat present. Conversely, crystallization may be effected in situ in a system containing a major amount of fat. Thus, the dried product may suitably contain from about 2.0% to about 70.0% or more fat. Preferably, the product may contain about 10.0% to about 50.0% fat.

The present invention provides an easily wettable, readily dispersible, fat-containing food product which does not require the addition of chemical wetting agents such as lecithin. Further, the invention provides a process for preparing in situ a wettable, dispersible fat-containing product without performing the "winterizing" steps considered essential by the prior art. The invention also has provided a novel butter fat product which has superior stability and contains the natural fat globule membrane.

While the principles of the invention have been described, in part, by reference to a lacteal-butter fat system the invention is demonstrated to be equally applicable to vegetable and animal fats and to nonlacteal, nonmiscible systems. Accordingly, it is intended that the natural modifications and variations of the invention which will occur to those skilled in the art upon reading the above disclosure and which fall within the scope of the appended claims be included in the invention.

Having described the invention, what is claimed is:

1. A composition comprising an integrally formed dried product consisting of individual parts, each of said parts having a fat composition and a nonfat composition nonmiscible in said fat composition, said fat composition consisting of readily discernible high melting point fractions and low melting point fractions, said nonmiscible nonfat portion coating said high and low melting point fractions to isolate said high melting point fraction from said low melting point fraction.

2. The composition defined in claim 1 further characterized in that said nonfat composition is lacteal solids.

3. The composition of claim 2 wherein said fat is butterfat comprising about 10.0 wt. percent to about 50.0 wt. percent of the total dry composition.

4. A water wettable dry fat-containing compositions comprising: a fat having a plurality of melting fractions; nonfat solids; said product characterized in that the fat composition is divided into discrete globules of high and low melting fat isolated by a continuous phase of nonfat solids and in that each dry fat containing particle contains a substantially uniform distribution of high and low melting fat fractions.

5. The composition of claim 4 wherein the fat is butterfat and the nonfat solids are lacteal solids.

6. The composition of claim 4 wherein the fat is vegetable fat comprising from about 2.0 wt. percent to about 70.0 wt. percent of the total composition.

References Cited by the Examiner

UNITED STATES PATENTS

| 888,017 | 5/1908 | Just | 159—48 |
| 1,374,555 | 4/1921 | Dick | 99—203 |
| 2,144,371 | 1/1939 | Griffith et al. | 99—118 X |
| 2,966,409 | 12/1960 | Williams et al. | 99—56 |

OTHER REFERENCES

McDowall: "Buttermaker's Manual," 1953, vol. I, pp. 55 to 57.

A. LOUIS MONACELL, *Primary Examiner.*

M. W. GREENSTEIN, *Assistant Examiner.*